United States Patent [19]

Sorko-Ram

[11] 4,339,400

[45] Jul. 13, 1982

[54] PROCESS FOR PRODUCING THREE-DIMENSIONAL, MIRRORED ACRYLIC ARTICLES

[76] Inventor: Paul A. Sorko-Ram, 1111 N. Centerville, Sturgis, Mich. 49091

[21] Appl. No.: 262,234

[22] Filed: May 11, 1981

[51] Int. Cl.$^3$ .............................................. B29D 11/00
[52] U.S. Cl. ...................................... 264/1.9; 264/2.7; 264/134; 264/230; 264/342 R; 264/510; 427/163
[58] Field of Search ................... 264/1.7, 1.9, 2.7, 81, 264/134, 230, 293, 510, 516, 342 R; 427/163, 164, 316

[56] References Cited

U.S. PATENT DOCUMENTS

| | | | |
|---|---|---|---|
| 2,740,732 | 4/1956 | Peck et al. ............................ | 117/227 |
| 3,000,057 | 9/1961 | Swedlow et al. ..................... | 264/2.7 |
| 3,094,430 | 6/1963 | Skwierinski ......................... | 427/164 |
| 3,431,135 | 3/1969 | Keane et al. ......................... | 117/46 |
| 3,914,471 | 10/1975 | Cobb et al. ......................... | 427/250 |
| 3,967,992 | 7/1976 | McCaskey, Jr. et al. ........... | 264/342 |
| 4,139,586 | 2/1979 | Gasson ................................ | 264/2.7 |
| 4,154,788 | 5/1979 | Hockensmith et al. ............. | 264/554 |
| 4,255,364 | 3/1981 | Talbert ................................ | 264/1.9 |

FOREIGN PATENT DOCUMENTS 614459 12/1948 United Kingdom ................. 264/1.9

*Primary Examiner*—James B. Lowe
*Attorney, Agent, or Firm*—Krass, Young & Schivley

[57] ABSTRACT

A process for producing three-dimensional, mirrored acrylic products using forming techniques eliminates micro-fracturing of a vacuum deposited reflective metal coating by preshrinking a sheet of acrylic before the sheet is mirrorized and formed into the desired three-dimensional shape. Preshrinking is accomplished by heating the sheet to forming temperature and allowing the heated sheet to cool at room temperature before the sheet is formed. Deposition of the metallic reflective coating is performed after the preshrinking step.

11 Claims, No Drawings

PROCESS FOR PRODUCING THREE-DIMENSIONAL, MIRRORED ACRYLIC ARTICLES

TECHNICAL FIELD

The present invention generally relates to three-dimensional plastic articles having highly reflective surfaces, and deals more particularly with a process for forming a sheet of acrylic plastic into a desired shape after a reflective metal coating has been vapor deposited thereon.

BACKGROUND ART

Plastic products having highly reflective surfaces are being employed with increasing frequency as mirrors and reflectors in various applications including advertising. Plastic reflectors offer several advantages over conventional mirrored glass articles including improved manufacturing economy and the ease with which plastic reflectors may be formed into any of various three-dimensional shapes.

Previously, three-dimensional, mirrored plastic products were produced by first forming a sheet of suitable thermo-plastic material into a three-dimensional shape. The forming process involved heating the sheet to forming temperature and then using either gravity or a vacuum to draw the sheet over a tool or die corresponding to the final shape of the product. After the formed plastic had cooled, the surfaces of the product were metallized with a reflective metal coating; this was usually accomplished using conventional vacuum deposition techniques. This sequence of processing steps is undesirable, however, since special vacuum deposition equipment may be required to accommodate the plastic substrate after it has been formed into a three-dimensional shape. Moreover, it is substantially more difficult to obtain a deposited metal coating which is substantially even in thickness, particularly where the surfaces of the plastic substrate are irregular, i.e., curved, angular, wavy.

Mirrored (metallized) plastic sheets are presently commercially available. However, it has not been heretofore possible to convert these mirrored sheets into three-dimensional shapes because of a phenomena known in the art as "blushing". Blushing describes the appearance of the mirrored finish after forming has been completed, in which the reflectivity of the finish has been substantially reduced and in which the finish appears substantially grey, rather than highly reflective. A blushed finish is one in which the continuous metallic reflective coating is converted to a multiplicity of microfractures which refract, rather than reflect, light impinging on the surface of the article. Blushing is believed to be caused by differences in mechanical properties of the plastic substrate and the metallic coating, along with the tendency of the plastic substrate to give off residual gases, when heated, during the forming process, which adversely react with the molecules of the metallic coating.

DISCLOSURE OF THE INVENTION

The present invention overcomes the deficiencies of the prior art discussed above and provides a process in which three-dimensional mirrorized articles can be produced from mirrorized sheets of acrylic plastic. The invention involves recognition of the fact that blushing of the mirrorized sheets during the forming process may be avoided by shrinking the sheet prior to mirrorizing and subsequent forming. Shrinking is accomplished by heating the sheet to a temperature sufficient to form the sheet and then cooling the sheet substantially to room temperature. A layer of vapor deposited reflective metal is applied to the sheet after the sheet is heat treated. The metallized, heat treated sheet is then heated to forming temperature and formed into the desired three-dimensional shape.

BEST MODE FOR CARRYING OUT THE INVENTION

The present invention broadly involves a process for producing three-dimensional thermoplastic articles, particularly acrylic plastic, having metallized surfaces which are highly reflective. The term "acrylic plastic" as used herein is defined as any thermo-plastic material having a substantially methylmethacrylate base. However, the invention contemplates the use of other thermoplastics such as polycarbonates and the like.

Relatively large sheets (4×8 feet) of clear (transparent) acrylic having a mirrorized surface thereon are commercially available from any of various sources, such as the Ram Products Company. Such sheets are typically 0.080 to 0.250 inch thick and have a mirrorized finish which is produced by applying a thin-layer of reflective metal, such as aluminum or the like, thereto by known vacuum deposition techniques. The vacuum deposition technique involves directing a stream of metal vapor onto the surface of the acrylic sheet by a vacuum evaporation in which metal, e.g., aluminum, is heated in a high vacuum to a temperature which exceeds its melting point. Under these conditions, the metal vaporizes emitting molecular rays which impinge upon the acrylic substrate and condense so as to form a thin metallic film over the entire sheet. A layer of suitable paint is applied over the reflective metal coating in order to protect the mirror finish from abrasion during handling and subsequent processing steps. As will be discussed hereinafter, the metallized acrylic sheet may be converted to a three-dimensional article by conventional forming techniques.

It has been discovered that the phenomena of blushing encountered during the vacuum forming process may be avoided by shrinking the sheet prior to the metallization forming steps. Shrinking is accomplished by placing the sheet in an oven and heating it to a temperature sufficient to form the sheet; typically, this temperature will be between 250° and 400° F. The preheating step is continued for at least approximately five to ten minutes, depending upon the thickness of the sheet. The preheated sheet is then removed from the oven and is allowed to cool to room temperature before further processing.

After the preshrunk sheet has cooled to room temperature, it is metallized, reheated to forming temperature and formed, using conventional forming equipment, to the desired three-dimensional shape. The effectiveness of the process of the present invention is apparent from the following example.

EXAMPLE

A sheet of clear acrylic plastic measuring 4×8 feed and ⅛ inch thick was placed in an oven for 10 minutes at 400° F. The temperature in the oven was substantially uniform throughout. The sheet was removed from the oven and allowed to cool to room temperature. A metallic coating was then applied to one face of the sheet to create a mirror like finish. A protective layer of paint was applied to the metallic coating. Three circularly shaped pieces of differing diameters were the cut from the mirrorized sheet. Each piece was heated to a temperature of between 250° and 265° F. for a period of between 5 and 6 minutes, following which the pieces were vacuum formed into convex shaped lenses of differing depths. The resulting convex reflective lenses were of high reflectivity and no evidence of blushing in any of the lenses was apparent.

It has been found that the degree of shrinkage of thermoplastic sheets is fairly substantial and may be easily measured. For example, a square sheet of acrylic measuring 4 feet on each side and ⅛ inch thick was found to shrink ¾ inch on each side when subjected to the preshrinking process previously described. It is believed that blushing of the metallic, reflective coating is eliminated as a result of both the preshrinkage of the acrylic as well as the fact that residual, active gases are removed from the acrylic before the forming process is carried out.

It is thus apparent that the present invention provides a process for producing a three-dimensional thermoplastic article having a mirror-like reflective finish which comprises the steps of: heating a sheet of acrylic plastic to a temperature sufficient to form the sheet but less than the melting temperature of the sheet; then cooling the sheet substantially to room temperature; depositing a layer of reflective metal on the surface of the sheet; then, heating the sheet to a temperature sufficient to form the sheet; and, forming the sheet into the desired shape of the article.

From the foregoing, it is apparent that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof clearly within the scope of the invention.

What is claimed is:

1. A process for producing a three-dimensional thermoplastic object having a mirror-like reflective finish, comprising the steps of:
   (A) heating a sheet of thermoplastic material to a temperature sufficient to form said sheet but less than the melting temperature of said sheet;
   (B) then, cooling said sheet substantially to room temperature;
   (C) then, depositing a layer of reflective metal on the surface of said sheet;
   (D) then, heating said sheet to a temperature sufficient to form said sheet; and,
   (E) then, forming said sheet into the shape of said three-dimensional object.

2. The process of claim 1, wherein said material is of a substantially methylmethacrylate base.

3. The process of claim 2, wherein step (A) is performed for approximately five to ten minutes.

4. The process of claim 2, wherein said temperature of step (A) is in the range of 250° to 400° F.

5. The process of claim 2, wherein step (B) is carried out at room temperature.

6. The process of claim 2, wherein said temperature of step (D) is at least approximately 250° F. and step (D) is continued for at least approximately five minutes.

7. The process of claim 2, wherein step (E) is performed by subjecting said sheet to a vacuum.

8. The process of claim 2, including the step of applying an abrasion resistant coating on said layer of reflective metal.

9. A process for producing a three-dimensional reflective object from thermo-plastic material, comprising the steps of:
   (A) preshrinking a sheet of said thermo-plastic material;
   (B) then, vapor depositing a reflective layer on said sheet;
   (C) then, forming said sheet into the shape of said object.

10. The process of claim 9, wherein step (A) is performed by heating said sheet to a temperature sufficient to form said sheet and then cooling the heated sheet to substantially room temperature.

11. The process of claim 10, wherein said sheet is heated at said temperature for a period of approximately five to ten minutes.

* * * * *